United States Patent [19]

Yonejirou et al.

[11] Patent Number: 5,142,643
[45] Date of Patent: Aug. 25, 1992

[54] SAMPLED VIDEO SIGNAL GENERATING DEVICE FOR IMPROVING DEVIATION BASED ON DIFFERENCE OF CIRCUIT CHARACTERISTICS AMONG CHANNELS

[75] Inventors: Hiramatsu Yonejirou, Mitaka; Shibazaki Shigeru, Hidaka; Sudoh Seiji, Matsudo; Sakatsuji Osamu, Kashiwa; all of Japan

[73] Assignee: Sharp Kabushiki Kaisha, Osaka, Japan

[21] Appl. No.: 589,772

[22] Filed: Sep. 28, 1990

[30] Foreign Application Priority Data

Oct. 3, 1989 [JP] Japan ................... 1-258322

[51] Int. Cl.$^5$ ............................................. H09N 5/14
[52] U.S. Cl. .............................. 358/160; 358/21 R; 358/172
[58] Field of Search ............ 358/147, 138, 160, 174, 358/172, 241, 141, 142, 140, 21 R, 11, 167, 315, 316, 323, 340, 27, 34; 340/784

[56] References Cited

U.S. PATENT DOCUMENTS

| | | |
|---|---|---|
| 4,356,508 | 10/1982 | Okada . |
| 4,414,572 | 11/1983 | Flory . |
| 4,754,323 | 6/1988 | Kaji et al. ............ 358/316 X |
| 4,766,430 | 8/1988 | Gillette et al. ......... 358/241 X |
| 4,901,150 | 2/1990 | Klingelhofer et al. ........ 358/167 |

OTHER PUBLICATIONS

Japanese Patent Laying Open No. 64-32782 (Laying Open date Feb. 1989) (filing date Jul. 1987) and English abstract thereof.
Japanese Patent Laying Open No. 61-198885 (Laying Open date Sep. 1986) (filing date Feb. 1985) and English abstract thereof.
M. Mizuta, "Recording and Reproducing Device" Abstracts of Japan. vol. 11, No. 31, (E-475) [2478]Jan. 29, 1987.

*Primary Examiner*—Victor R. Kostak
*Attorney, Agent, or Firm*—David G. Conlin; Robert F. O'Connell

[57] ABSTRACT

An improved video signal processing circuit (63) in the high quality television system for alternating-current driving a liquid crystal module (64) is disclosed. A reference signal is inserted into vertical blanking periods of a R signal by a reference signal generator (20) and switching circuit (4). The R signal in which the reference signal is inserted in converted into digital signals of n channels by an A/D converter (6). There exists difference in circuit characteristics among signal processing circuits for processing the respective digital signals. However, the signals signal-processed for each channel are supplied to microcomputer 21 through switching circuits $18_1$–$18_n$). Since the microcomputer 21 controls full scale level and offset level of D/A converters $9_1$–$9_n$ and adders $11_1$–$11_n$, the deviations produced among sampled video signals due to difference in circuit characteristics among channels can be reduced.

8 Claims, 8 Drawing Sheets

SAMPLED VIDEO SIGNAL GENERATING DEVICE FOR IMPROVING DEVIATION BASED ON DIFFERENCE OF CIRCUIT CHARACTERISTICS AMONG CHANNELS

BACKGROUND OF THE INVENTION

1. Field of the Invention

The present invention generally relates to a sampled video signal generating device, and more particularly to a sampled video signal generating device in which deviation which may be caused among sampled video signals due to differences in circuit characteristics among channels is reduced. The present invention has particular applicability to a sampled video signal generating device for a Liquid Crystal Display.

2. Description of the Background Art

In a high quality television system known as a television system for the next generation, the so-called "High Vision", resolution is increased as compared to present television systems, resulting in providing vivid image to viewers. That is to say, in High Vision, the number of horizontal scanning lines is defined to be 1125 or more for one frame, interlace is set at 2:1 or no-interlace, and aspect ratio at 16:9. On the other hand, in the NTSC system which is the current television system, the number of horizontal scanning lines is determined to be 525 for one frame, and interlace ratio is set at 2:1, and aspect ratio at 4:3. As a result, the amount of information handled in the High Vision system is about 5 times or more than that in the NTSC system.

As described above, since it is necessary to handle a larger amount of information in the high quality television system, various devices have been invented for video signal processing. For example, in a video signal processing circuit for supplying video signals to a liquid crystal display according to the high quality television system, the number of picture elements is considerably increased, so that the video signals should be sampled at an extremely high speed. Video signals sampled at high speed are provided as picture element signals to the horizontal scanning circuits of the respective liquid crystal panels in the liquid crystal display. As the digital horizontal scanning LSI circuit, one of a sample-and-hold type is employed because of its excellent technical property.

However, as a digital horizontal LSI has a limit in speed of high vision signal scanning, a plurality simultaneous scanning system which divides a single video signal into a plurality of channels is employed. That is to say, a continuous video signal is sampled at predetermined time intervals to produce sampled video signals divided into a plurality of channels. The produced signals are simultaneously inputted to the horizontal scanning circuits. In other words, the operation speed of the horizontal scanning circuit connected to each channel can be reduced to 1/n by dividing a single video signal into sampled video signals of n channels. Since the operation speed of the horizontal scanning circuit connected to each channel is reduced, desired horizontal resolution can be easily implemented without reducing video frequency bandwidth by the horizontal scanning circuit. Here, the phase disorder among the n channels should be restrained within a permitted value corresponding to the sampling frequency.

As described above, since a single video signal is divided into a plurality of channels by sampling and the video signal processing for obtaining sampled video signals is performed for each channel, differences in circuit characteristics among signal processing circuits for handling video signals of the respective channels is not acceptable. That is to say, when deviation of circuit characteristics exists among signal processing circuits, the picture quality of an image obtained according to video signals generated from the respective signal processing circuits is degraded. Such deviation of circuit characteristics occurs not only because of various differences of manufacturing conditions but also can be produced due to environmental conditions in u⋅ such as temperature and moisture.

SUMMARY OF THE INVENTION

It is an object of the present invention to improve horizontal resolution of images obtained based on generated video signals in a sampled video signal generating device generating sampled video signals divided into a plurality of channels by sampling.

It is another object of the present invention to decrease deviation among sampled video signals produced due to differences in circuit characteristics among channels in a sampled video signal generating device generating sampled video signals divided into a plurality of channels by sampling.

It is still another object of the present invention to improve horizontal resolution of images displayed on a liquid crystal display device in the sampled video signal generating device providing sampled video signals divided into a plurality of channels to a liquid crystal display device.

It is yet another object of the present invention to reduce deviation produced among sampled video signals according to differences in circuit characteristics among channels in a sampled video signal generating device for supplying sampled video signals divided into a plurality of channels to a liquid crystal display device.

Briefly stated, the sampled video signal generating device according to the present invention includes a circuit generating a reference level signal for defining changeable level of a video signal, an inserting circuit for inserting a reference level signal into vertical blanking periods of a video signal, a sampling circuit for sampling the video signal in which a reference level signal is inserted on a predetermined cycle and generating n sampled video signals, n signal processing circuits for applying predetermined signal processing to the respective sampled video signals, a detecting circuit for detecting reference level signals included in the respective signal-processed signals, and a level control circuit for controlling changeable levels of the respective signals generated from the signal processing circuits in response to the detecting circuit.

In operation, the inserting circuit inserts a reference level signal into vertical blanking periods of a video signal. The video signal in which a reference level signal is inserted is divided into n sampled video signals by the sampling circuits. The respective sampled video signals are subjected to signal processing by n signal processing circuits, respectively. The detecting circuit detects reference level signals included in the signals processed by the respective signal processing circuits. The level control circuit controls changeable levels of signals generated from the respective signal processing circuits in response to the detecting circuit, to restrain differences of signal levels produced due to deviations of circuit characteristics caused among signal processing circuits.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
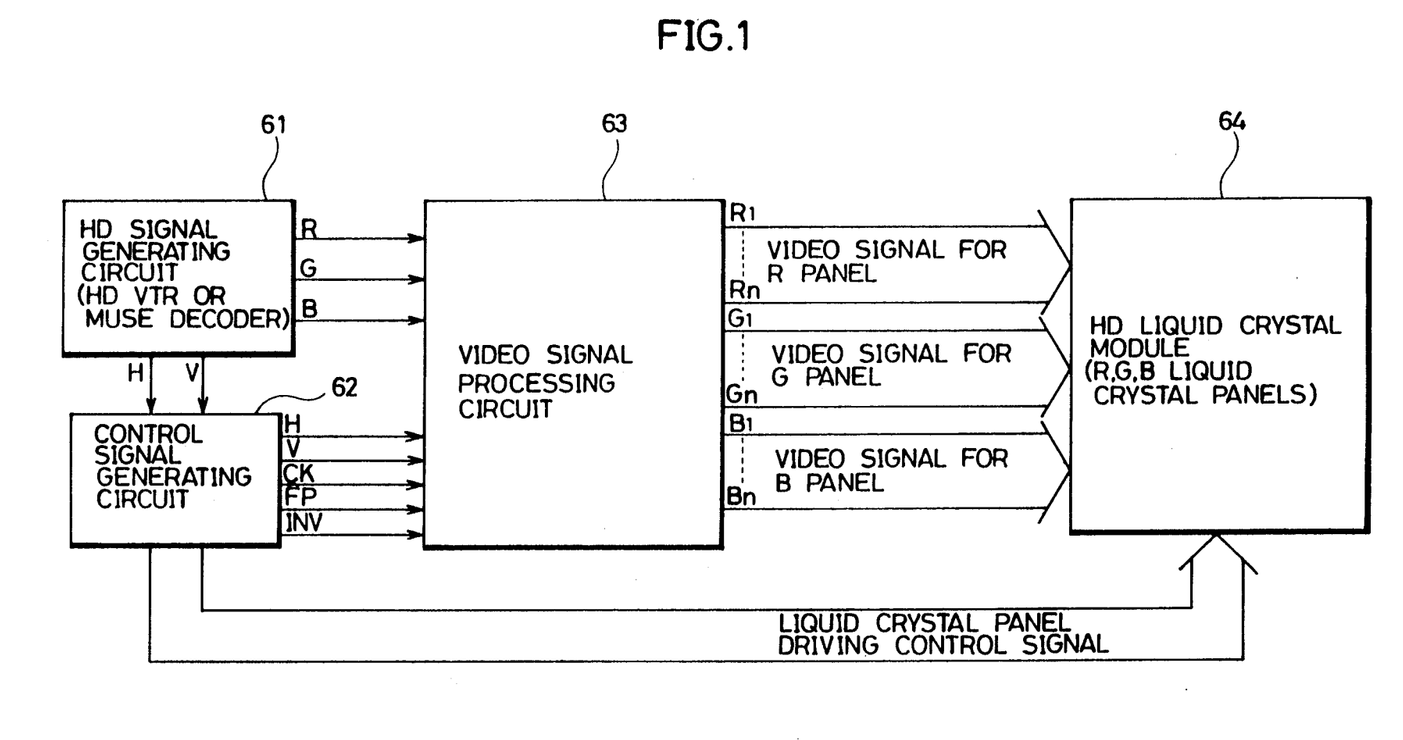
FIG. 1 is a block diagram of a liquid crystal display device to which a video signal processing circuit of one embodiment of the present invention can be applied.

In the description below, the description will be given about a case where a video signal processing circuit according to the present invention is applied to a liquid crystal display device. Referring to FIG. 1, the liquid crystal display device includes a high definition (referred to as "HD" hereinafter) signal generating circuit 61, a control signal generating circuit 62, a video signal processing circuit 63 for liquid crystal display, and a HD liquid crystal module 64. As a HD signal generating circuit 61, HD video tape recorder (VTR) or a multiple sub-Nyguist sampling encoding (MUSE) decoder or the like can be employed. HD signal generating circuit 61 generates R, G and B signals according to high quality television system, a horizontal synchronous signal H, and a vertical synchronous signal V. Control signal generating circuit 62, responsive to the horizontal synchronous signal H and the vertical synchronous signal V, generates various control signals. That is to say, control signal generating circuit 62 generates, in addition to horizontal synchronous signal H and vertical synchronous signal V, a clock signal CK, a frame pulse signal FP, an inversion signal, and digital signals necessary for controlling video signal processing and the liquid crystal module.

Liquid crystal module 64 includes three liquid crystal panels for R, G and B signals. Video signal processing circuit 63 generates video signals R1 through Rn for the R module, video signals G1 through Gn for the G module, and video signals B1 through Bn for the B module, and digital signals for controlling each module, and supplies them to three liquid crystal modules 64. In liquid crystal module 64, based on the supplied video signals, full color image is obtained.

Figure 2:
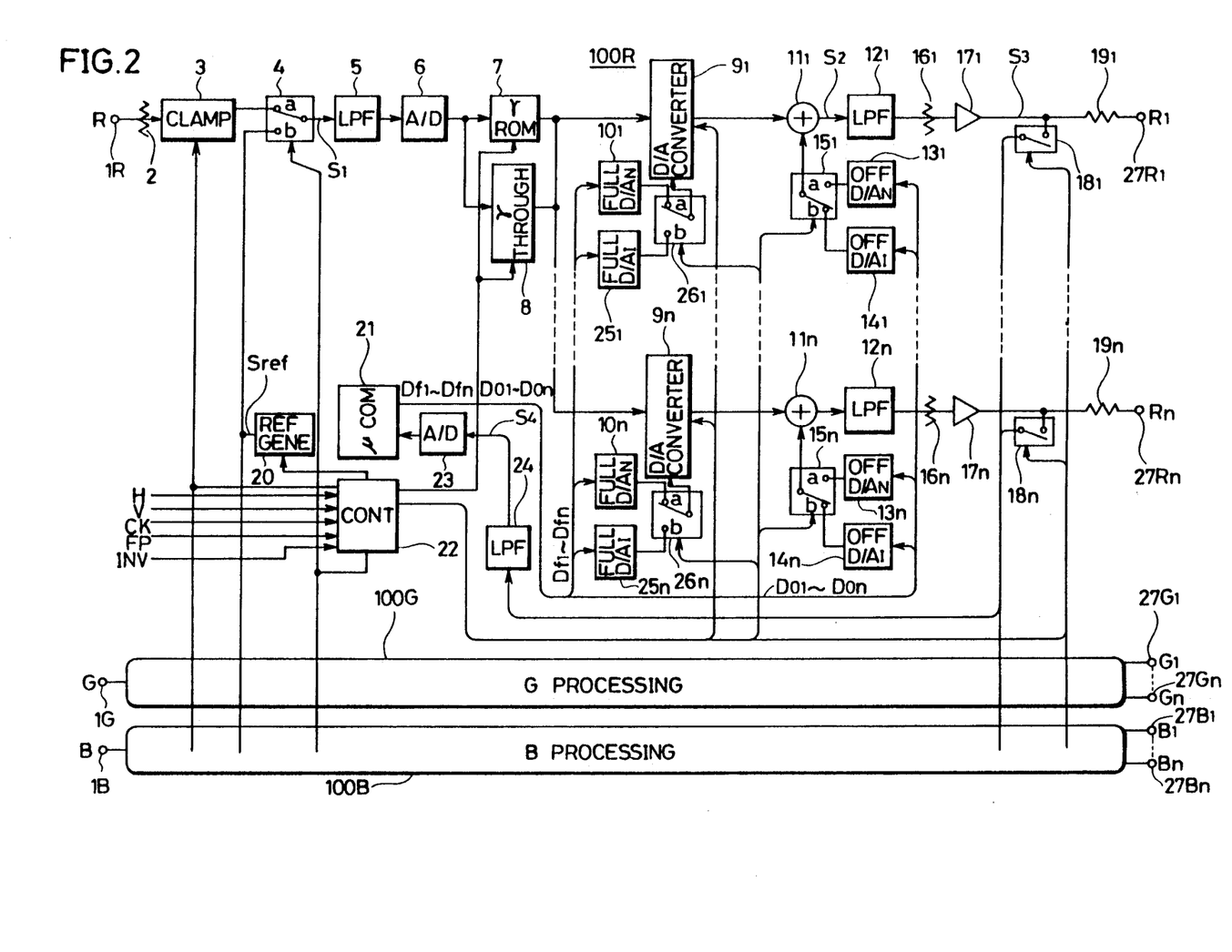
FIG. 2 is a block diagram of a video signal processing circuit for liquid crystal display showing one embodiment of the present invention.

As a video signal processing circuit 63 shown in FIG. 1, the circuit shown in FIG. 2 is employed. Referring to FIG. 2, the video signal processing circuit for liquid crystal display includes a R signal processing circuit 100R for R signal processing, a G signal processing circuit 100G for G signal processing, and a B signal processing circuit 100B for B signal processing. Since the respective signal processing circuits 100R, G and B have similar circuit structure, only R signal processing circuit 100R will be described to simplify the description below.

R signal processing circuit 100R is connected to receive an R signal generated by HD signal generating circuit 61 shown in FIG. 1 through an input terminal 1R. The R signal provided at the terminal 1R is provided to a terminal a of a switching circuit 4 through an attenuator 2 and a clamp circuit 3. Switching circuit 4 is connected to receive a reference signal Sref generated by a reference signal generator 20 at its terminal b. The reference signal Sref will be described later in detail.

Switching circuit 4 repeats its switching operation in response to control signals generated from controller 22 to insert the reference signal Sref into vertical blanking periods of the R signal. In other words, in switching circuit 4, terminal a is selected in a display period of R signal, and terminal b is selected in a vertical blanking period of R signal. As a result, a signal S1 in which a reference signal Sref is inserted into vertical blanking periods of an R signal is generated from switching circuit 4.

Signal processing controller 22 is connected to receive a horizontal synchronous signal H and a vertical synchronous signal V generated from HD signal generating circuit 61 shown in FIG. 1 and a clock signal CK, a frame pulse signal FP, and a H inversion signal INV generated from the control signal generating circuit 62 of FIG. 1. Controller 22, in response to these signals, generates various control signals required in R signal processing circuit 100R.

Signal S1 generated from switching circuit 4, after being bandwidth-limited by a low pass filter LPF5, is supplied to an A/D converter 6. A/D converter 6 converts the supplied video signal sampled by CK buffered by controller 22 into n channel digital signals in response to a sampling pulse generated from controller 22. That is to say, A/D converter 6 converts a provided analogue signal into digital signals for every predetermined sampling cycle to form n channels of digital video signals.

The digital signals generated from A/D converter 6 are provided to a $\gamma$ correction circuit 7 and a $\gamma$ through circuit 8. $\gamma$ correction circuit 7 receives digital signals and provides $\gamma$-corrected non-liner data. $\gamma$ through circuit 8 provides liner data without $\gamma$-correction. $\gamma$ correction circuit 7 and $\gamma$ through circuit 8 operate alternately in response to control signals generated by controller 22. In other words, $\gamma$ through circuit 8 provides liner data in periods in which the reference signal Sref is inserted, and $\gamma$ correction circuit 7 provides $\gamma$-corrected non-liner data in other periods. By alternately operating circuits 7 and 8, operating processes employing the reference signal Sref which will be described later can be performed easily.

Output signals generated by $\gamma$ correction circuit 7 and $\gamma$ through circuit 8 are supplied to D/A converters $9_1$–$9_n$. Each of D/A converters $9_1$–$9_n$ sequentially converts a digital signal into an analogue signal in response to a control signal generated by controller 22. In addition, each of D/A converters $9_1$–$9_n$ performs a signal inverting process for each horizontal period. The signal inverting process is necessary for alternating-current driving a liquid crystal panel. In a vertical blanking period in which a reference signal Sref is inserted, it is preferable not to perform this signal inverting process.

The respective signals generated by D/A converters $9_I$-$9_n$ are provided through adders for offset adjustment $11_I$-$11_n$, low-pass filters $12_I$-$12_n$ attenuators $16_I$-$16_n$, buffers $17_I$-$17_n$, resistors $19_I$-$19_n$, and output terminals 27R-27Rn, respectively. The provided signals Rl-Rn are supplied to liquid crystal module 64 as video signals for R panel shown in FIG. 1.

The upper limit of frequency bandwidth of the circuit between A/D converters $9_I$-$9_n$ and output terminals $27R_I$-$27R_n$ is preferably set at a cut-off frequency of LPF$12_I$-$12_n$ to restrain difference of the n channels. That is, the present invention is characterized in that the cut-off frequency of LPF does not follow the general Nyquist principle. This is important as technology for giving quantization effect and obtaining high horizontal resolution when performing digital horizontal scanning.

The signals provided from the respective buffers $17_I$-$17_n$ are also supplied to microcomputer 21 through switching circuits $18_I$-$18_n$, low-pass filters 24 and A/D converter 23. That is to say, switching circuits $18_I$-$18_n$ responsive to control signals generated by controller 22 sequentially and alternately turn on in the periods in which a reference signal Sref is inserted. As a result, reference signal components inserted in vertical blanking periods of the respective signals Rl-Rn are sequentially extracted, and the extracted signal components are converted into digital signals by A/D converter 23.

Microcomputer 21 switches channels to be processed for every two horizontal periods, for example, and performs processing necessary for full scale level control of D/A converters $9_I$-$9_n$ and for offset level control by adders $11_I$-$11_n$. The process will be described in detail later.

As a result of processing in microcomputer 21, data Dfl-Dfn for controlling full scale level of D/A converters $9_I$-$9_n$ and data $Do_I$-$Do_n$ for controlling offset level by adders $11_I$-$11_n$ are generated. Full scale level control data Dfl-Dfn are supplied to D/A converters (D/A$_n$) $10_I$-$10_n$ for full scale control in a non-inverted period and full scale level control D/A converters (D/A$_I$) $25_I$-$25_n$ in an inverted period. Switching circuits $26_I$-$26_n$ are connected to outputs of the respective pairs of D/A converters $10_I$ and $25_I$ through $10_n$ and $25_n$. Switching circuits $26_I$-$26_n$, in response to control signals generated by the controller, alternately select ones of the pairs of D/A converters and supply control signals to full scale level control terminals of the corresponding D/A converters $9_I$-$9_n$.

Similarly, offset level control data $Do_I$-$Do_n$ are given to offset level control D/A converters $13_I$-$13_n$ in a non-inverted period and offset level control D/A converters $14_I$-$14_n$ in an inverted period. Switching circuits $15_I$-$15_n$ are respectively connected to the outputs of the respective pairs of D/A converters $13_I$ and $14_I$ through $13_n$ and $14_n$. Switching circuits $15_I$-$15_n$ supply offset signals to the corresponding adders $11_I$-$11_n$ in response to control signals generated from controller 22.

While each of switching circuits $26_I$-$26_n$ and $15_I$-$15_n$ shown in FIG. 2 is composed of an analogue switching circuit, a digital switching circuit in which D/A converters $10_I$, $25_I$, $13_I$ and $14_I$ are implemented in a single circuit is also applicable. Use of digital switching circuits further improves the property. This will be understood easily by those skilled in this art.

Figure 3:
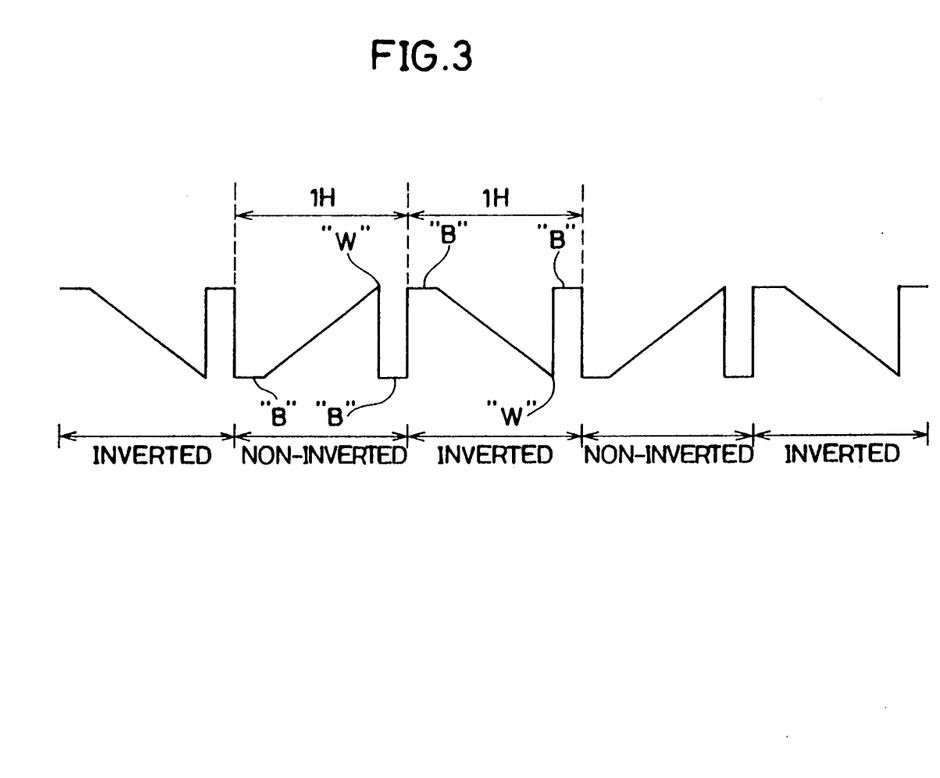
FIG. 3 is a wave form diagram showing a wave form in display period of a video signal for Liquid crystal display.

A wave form of a video signal in the display period is shown in FIG. 3. To AC-drive the liquid crystal panel, the video signal is inverted for every one horizontal period (IH) as shown in FIG. 3. That is, in a non-inverted period, the lowest level corresponds to black "B" and the highest level corresponds to white "W". On the other hand, in an inverted period, the highest level corresponds to black "B" and the lowest level corresponds to white "W". In this way, to AC-drive the liquid crystal panel, a video signal is inverted for every horizontal period. It is necessary that a consideration is given about signal inverting process in full scale level control and offset level control as well, since inverting process for AC driving is also performed in the circuit shown in FIG. 2.

Figure 4A:
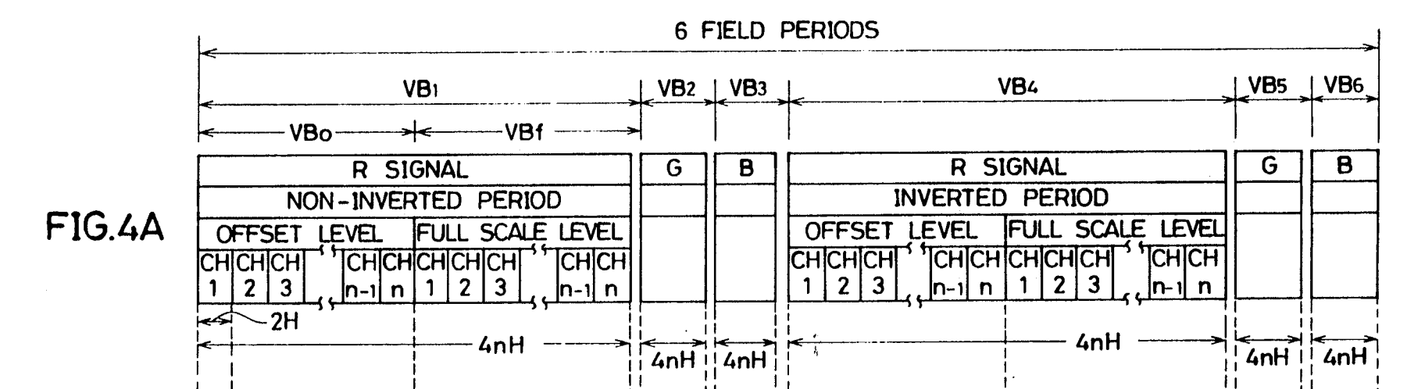
FIGS. 4A–4D are wave form diagrams of reference signals used in the circuit shown in FIG. 2.
Figure 4B:
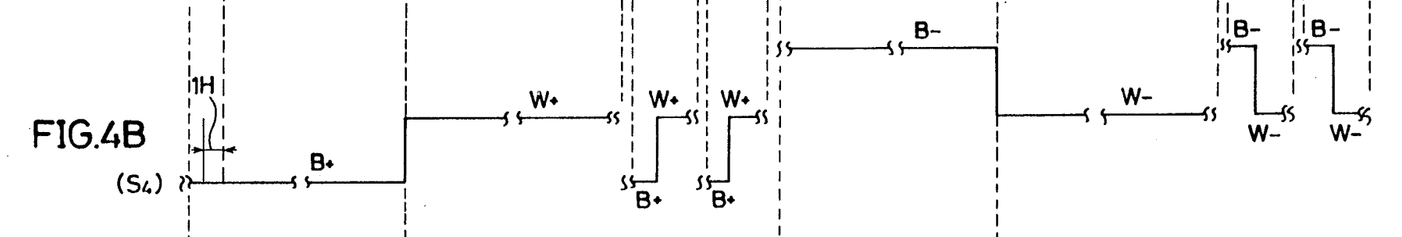
Figure 4C:
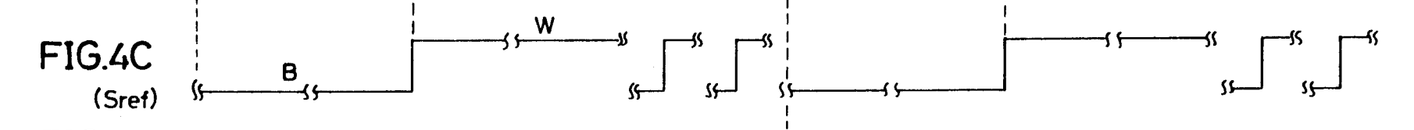

The level of the reference signal Sref generated by reference signal generator 20 shown in FIG. 2 is a two value signal shown in FIG. 4B. In FIGS. 4A-4D, display periods DP1-DP6 are eliminated. The first vertical blanking period VB1 is used for offset level control and full scale level control of the R signal in the non-inverted period as shown in FIG. 4A. That is, as shown in FIG. 4C, signal level B+ for offset level control is generated as reference signal Sref in the period VBo which is the first half of the period VB1. A signal Sref having signal level "W+" for full scale level control is generated in the latter half period VBf. In this case, the signal S4 shown in FIG. 4B is stored in a memory in microcomputer 24 through A/D23.

In the vertical blanking period in the second field, or in the second vertical blanking period, a similar control in non-inverted period is performed about the G signal. Accordingly, similarly to the case of the first vertical blanking VB1, the reference signal Sref produces potential for producing information of non-inverted offset level "B+" in the first half of the period, and produces potential for giving digital data of non-inverted full scale level "W+" to μCOM in the latter half. Furthermore, in the third vertical blanking period VB3, similarly, reference signal Sref for giving data of non-inverted offset level "B+" and non-inverted full scale level "W+" are generated.

In the fourth, fifth and sixth vertical blanking periods, the Sref similarly attains levels for offset level control and full scale level control. In this case, signal inverting is performed by D/A converters $9_I$ through $9_n$.

Figure 4D:
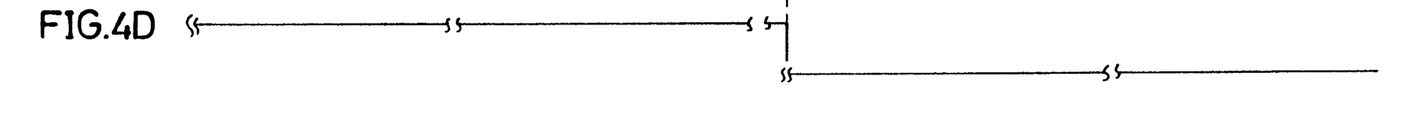

Reference signal generator 20 shown in FIG. 2, as shown in FIG. 4D, generates a stable binary signal for forming R G B information necessary to obtain data to be controlled in six fields.

Figure 5:
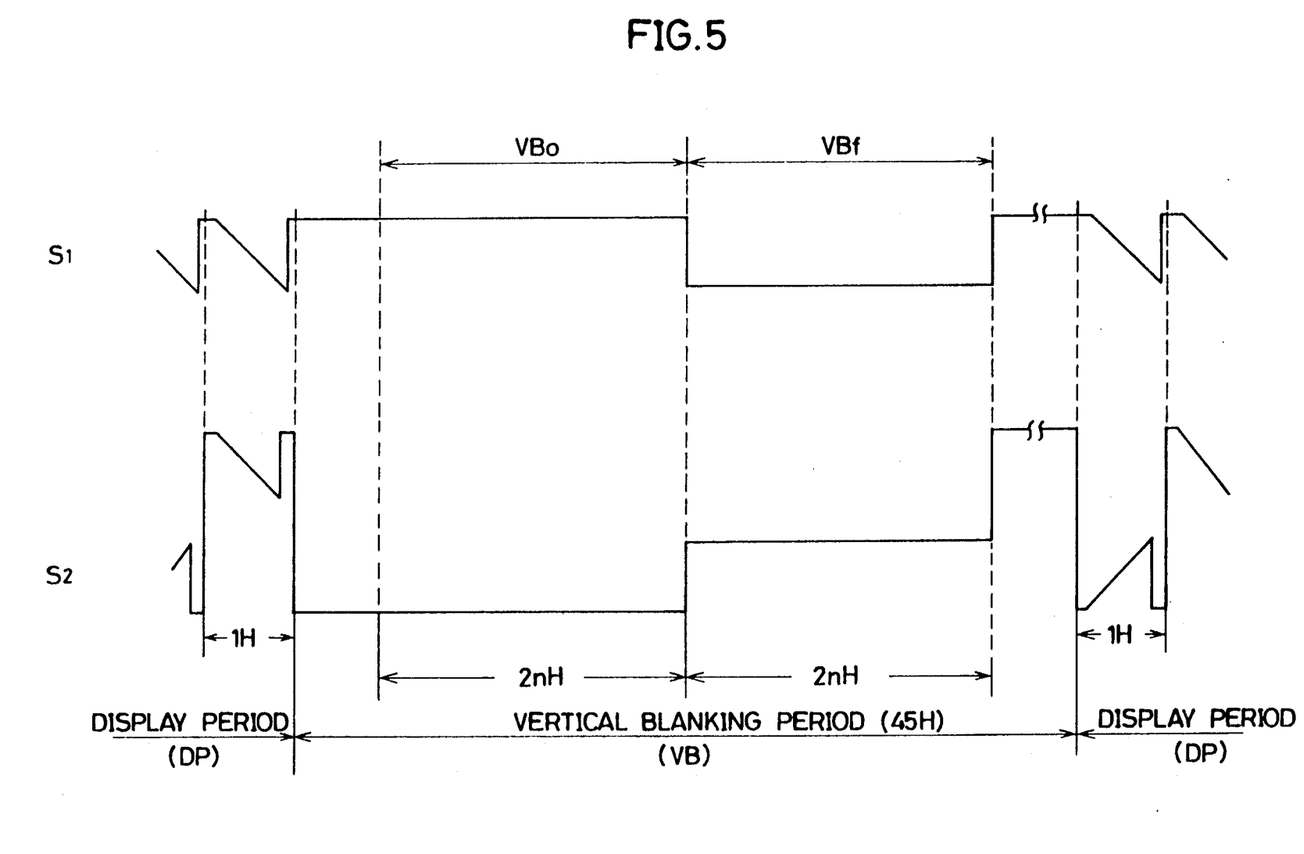
FIG. 5 is a wave form diagram showing wave forms of reference signals in a single vertical blanking period shown in FIG. 4.

A change of a signal in a certain vertical blanking period is shown in FIG. 5. In FIG. 5, the signal S1 is one in which a reference signal Sref is inserted by switching circuit 4 shown in FIG. 2, and the signal S2 shows an output signal of buffer $17_I$. In the embodiment shown in FIG. 2, the vertical blanking period VB has 45 horizontal cycles (45H). The offset level period Vbo and the full scale level period Vbf have time periods of 2nH, respectively (n corresponds to the number of channels in the circuit shown in FIG. 2).

This is because the signal S4 has to be precisely given to microcomputer 21 shown in FIG. 2. Thus, considering the resolution and converting time of A/D converter 23 and generation of system noise, the cut-off frequency of LPF 24 is reduced. Under this cut-off frequency, operable switching time is selected. Accordingly, 45H is selected in this embodiment, but a value less than 1/10 of that can be selected theoretically.

With respect to the level of the reference signal Sref (B and W), the level of the signal Sref is limited by A/D converters $9_1-9_n$. Accordingly, for a signal Sref level, to set a W value of 100% and a B value of 0% is not preferable in the control system because of non-linear controlling. Accordingly, the level of the reference signal Sref is set in the vicinity of a W value of 100% and in the vicinity of a B value of 0% in the present invention.

Figure 6:
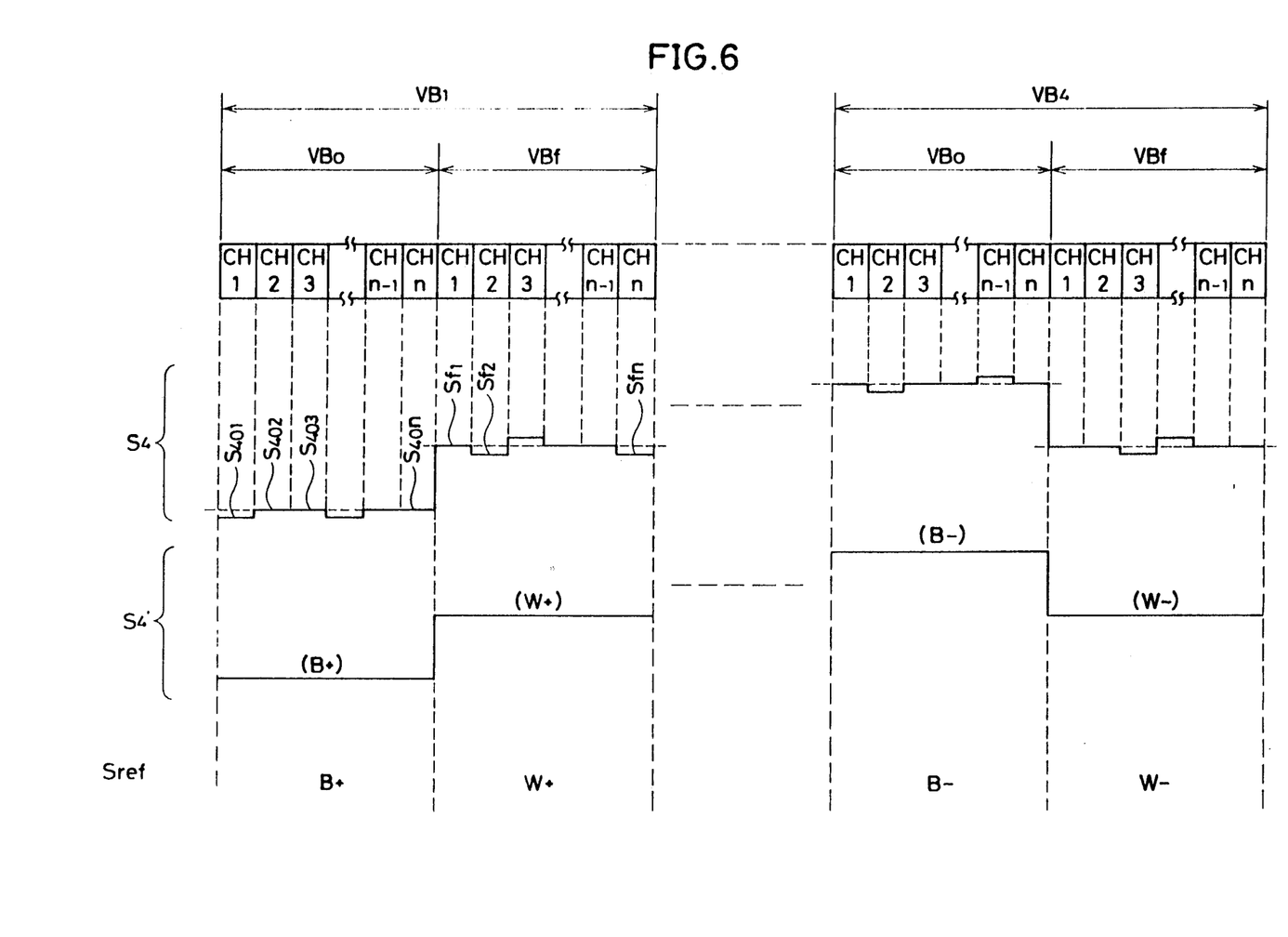
FIG. 6 is a timing chart for describing operation of the circuit shown in FIG. 2.

Referring to FIG. 6, operations for full scale level control and offset level control in the circuit shown in FIG. 2 will be described. As already described, in the first vertical blanking period VB1, offset level control and full scale level control in a non-inverted period of the R signal are performed. Furthermore, in the fourth vertical blanking period, offset level control and full scale level control in an inverted period of the R signal are performed. In the first half period Vbo of the first vertical blanking period VB1, a reference signal Sref having "B+" is generated, which signal is inserted in the R signal through switching circuit 4. The inserted signal S1, after converted into digital signals by A/D converter 6, is subjected to signal processing by D/A converters $9_1-9_n$ and adders $11_1-11_n$ and so forth. Since there are deviations of circuit characteristics among signal processing circuits of the respective channels, the signal S4 provided to microcomputer 21 through switching circuits $18_1-18_n$ has deviations. That is, as shown in FIG. 6, according to the deviations of circuit characteristics for the respective channels, the levels of signal S4 are different from each other (S41, S42, ... S4n). Since the levels of signal S4 are obtained according to the inserted reference signal Sref, it is ideal that there is no deviation among these signal levels. However, due to deviations among signal processing circuits for respective channels, deviations are caused among levels of signals $S4_1-S4_n$. Microcomputer 21, according to the signals $So_1-Sf_n$, reduces deviation among these signals $So_1-Sf_n$ by performing the following processes.

Figure 7:
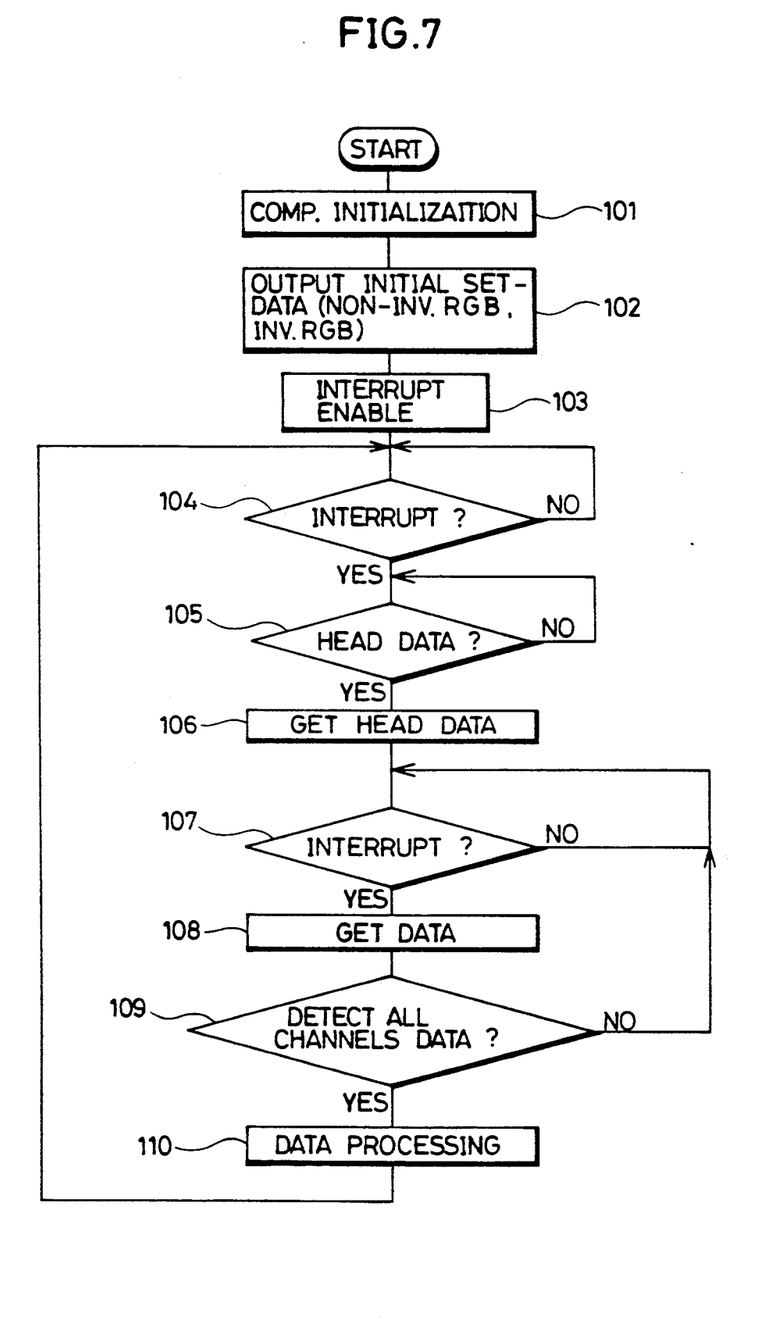
FIGS. 7 and 8 are flow charts for describing operation of the circuit shown in FIG. 2.
Figure 8:
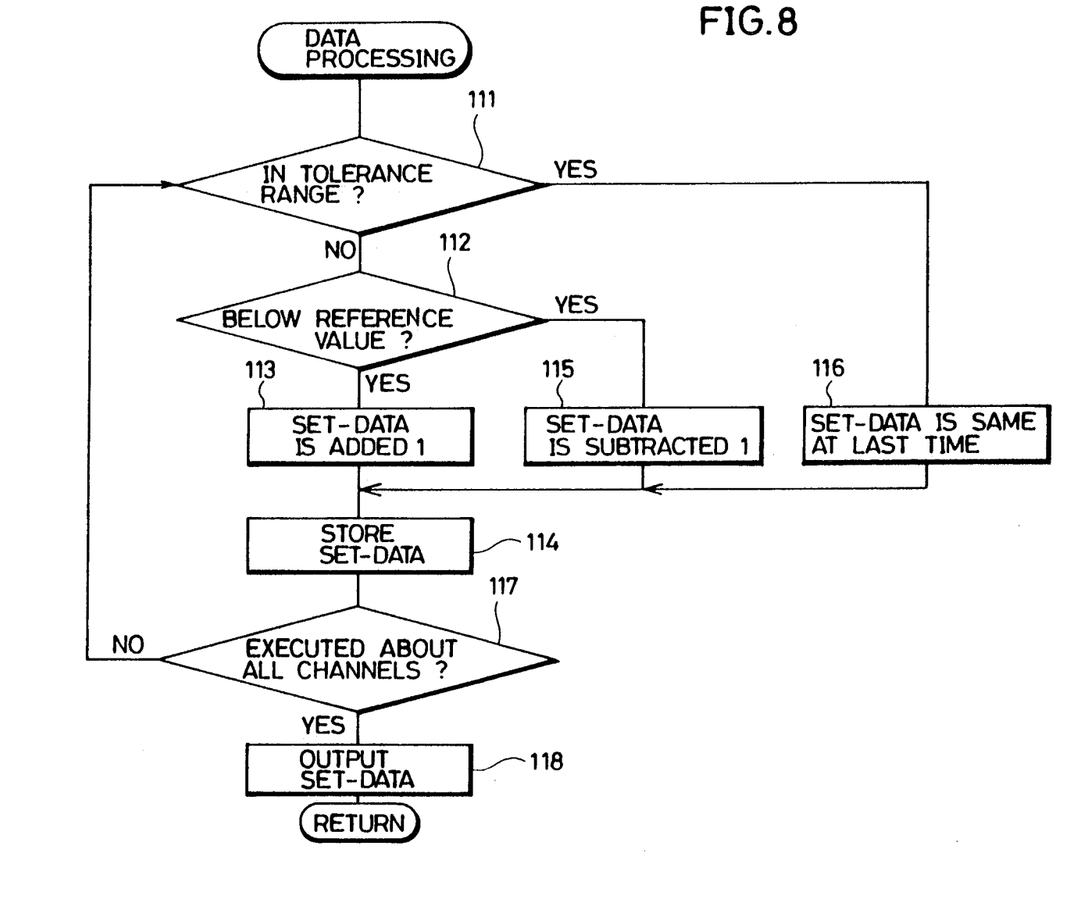

Referring to FIGS. 7 and 8, processing in microcomputer 21 will be described. Microcomputer 21 performs some initializations in step 101.

In step 102, initial data Do-Don for off set level control of a non-inverted signal and initial data Dfl-Dfn for full scale level control of non-inverted signals in the respective channels of the R signal are generated. The initial data Dol-Don for off set level control are supplied to D/A converters $13_1-13_n$, and the initial data Dfl-Dfn for full scale level control are supplied to D/A converters $10_1-10_n$. Accordingly, initial values are set at full scale level control inputs of D/A converters $9_1-9_n$, and initial values are set at offset level control inputs of adders $11_1-11_n$. As a result, in the first vertical blanking period VB1, signals S4ol-S4on and S4fi-S4fn are generated according to the initial full scale and offset control.

In parallel to or simultaneously with the above processing, initial values are also set in the processing system for a non-inverted signal of the G signal, the processing system for a non-inverted signal of the B signal, the processing system of an inverted signal of the R signal, the processing system for an inverted signal for the G signal, and the processing system for an inverted signal of the B signal.

In step 103, an interruption due to measuring is permitted.

In step 104, a determination is made as to whether an interruption is requested or not. Interruption signals are continuously supplied from controller 22 to reference signal generator 20 on a cycle of 2 horizontal periods in vertical blanking periods. Interruption signals are supplied in synchronization with horizontal periods of even number times of reference signal Sref of 4nH inserted in vertical blanking periods of the respective fields. When an interruption request is produced, the process in step 105 is started.

In step 105, it is determined whether the input data is head data (data of offset level and full scale level for N channels (2n data)). Since a flag indicating head data has been supplied from controller 22 in synchronization with the second horizontal period of reference signal Sref of 4nH inserted in vertical blanking periods of the respective fields, this determination is made according to whether this flag was supplied simultaneously with an interruption or not. When it is determined to be head data, the process in step 106 is started.

In step 106, the head data is captured. In this case, in the first field, connection switch 18 is connected and offset level (B+) of a non-inverted signal of the first channel of the R signal is detected (measured).

A switching circuit corresponding to the channel to be detected next time turns on in the horizontal blanking period after the data has been captured. In this case, the switching circuit $18_2$ is turned on after switching circuit $18_1$.

In step 107, it is determined whether an interruption is requested or not. When an interruption request exists, the process in step 108 is started.

In step 108, data of offset level (B+) of non-inverted signals of the second-n'th channels of the R signals and full scale level (W+) of non-inverted signals of the first-n'th channels are captured.

In step 109, a determination is made whether all of data of offset level and full scale level for n channels (2n) have been detected or not. In steps 107 and 108, data are repeatedly captured until 2n data are all detected.

The data process in step 110 are performed as shown in FIG. 8.

Referring to FIG. 8, in step 111, B+ level data in the first channel and its reference value data are compared with each other to determine whether the difference is in the tolerance range or not. When the difference is not in the tolerance range, the process advances to step 112, and if it is in the tolerance rage, the process advances to step 116.

In step 112, it is determined whether the difference is below the reference value or not.

When it is below the reference value, in step 113, the set data of offset level of a non-inverted signal in the first channel is increased by quantized data "1" and the increased data is stored in a memory in microcomputer 21 in step 114.

If it is not below the reference value, in step 115, the set data of offset level of a non-inverted signal in the first channel is decreased by quantized data "1", and the decreased data is stored in a memory in microcomputer 21 in step 114.

In step 116, with the set data maintained, the set data is stored in a memory in microcomputer 21 in step 114.

In step 117, it is determined whether all of the data of offset level and full scale level for n channels (2n) have been processed or not. The data processing in steps 111-116 are repeated until all of 2n data have been detected. When the processing is completed with respect to all the 2n data, the process in step 119 is started.

In step 118, offset level control data Dol-Don, and full scale level control data Dfl-Dfn are outputted. Data Dol-Don are applied to D/A converters $13_1-13_n$ shown in FIG. 2, and data Dfl-Dfn are applied to D/A converters 10₁-10ₙ. Accordingly, new values are set at full scale level control inputs of D/A converters 9₁-9ₙ and offset level control inputs of adders 11₁-11ₙ.

Thus, process in the first field is completed, and adjustment of the processing system of the non-inverted signal of the R signal is completed.

After this, the similar processing to those described above, or steps 104-110 of FIG. 7 are repeated and processing are applied to the second through the sixth fields. In the second and the third fields, adjustment of the processing system of non-inverted signals of the G signal, B signal are performed, respectively. In the forth through the sixth fields, adjustment of the processing systems of inverted signals of the R signal, G signal, and B signal are performed, respectively. Here, 1 cycle processing for adjustment of all the signal processing systems is completed.

Subsequently, similar processes are repeated on a cycle of 6 fields.

As described above, in this embodiment, step 119 (in FIG. 8) is executed by performing the adjustment of a non-inverted signal and an inverted signal of respective color signals in different vertical blanking periods (VB1, VB4 in R system).

However, it is better to perform [OUTPUT SET-DATA] (step 119) of a non-inverted signal and an inverted signal in same vertical blanking period, according to ideal performing.

It is a precondition to be over detecting from S4o1 to S4fn, data processing and OUTPUT SET-DATA in a predetermined vertical blanking period based on input Sref.

However, there is a case which said ideal performing can't be used because of the total processing time period of Microcomputer 21 to measure, data processing and output set-data.

The addition, said ideal performing is not so difficult when using a high speed processing microcomputer for handling high resolution image.

As described above, the offset level control data Do1-Don provided from microcomputer 21 are supplied to D/A converters 13₁-13ₙ and 14₁-14ₙ for the offset level control. D/A converters 13₁-13ₙ convert the provided data into analogue signals and provide the converted signals to the respective terminals a of switching circuits 15₁-15ₙ. Similarly, D/A converters 14₁-14ₙ also convert the data Do1-Don in inverted periods into analogue signals, and provide the converted signals to the respective terminals b of switching circuits 15₁-15ₙ. Switching circuits 15₁-15ₙ, in response to control signals generated by controller 22, alternately select one of terminals a and b. In other words, terminal a is selected in a non-inverted period of the R signal and terminal b is selected in an inverted period. As a result, signals for offset level control are provided to adders 11₁-11ₙ through switching circuits 15₁-15ₙ in appropriate timing, respectively.

Similarly, in the full scale level control, D/A converters 10₁-10ₙ and 25₁-25ₙ and switching circuits 26₁-26ₙ similarly operate. Each of D/A converters 9₁-9ₙ has a terminal for full scale level control. That is, by controlling voltage level applied to a terminal for full scale level, the maximum level of an output signal generated by a D/A converter is controlled. A signal provided from each of switching circuits 26₁-26ₙ is provided to a terminal for full scale level control of each of D/A converters 9₁-9ₙ, so that the full scale level control can be suitably performed for each channel.

As described above, in the video signal processing circuit shown in FIG. 2, reference signal generator 20 generates a reference signal Sref for defining offset level and full scale level in the non-inverted period and the inverted period of the R signal. The generated reference signal Sref is inserted into vertical blanking periods of the R signal by switching circuit 4. Accordingly, a signal S1 having the wave form shown in FIG. 5 is provided from switching circuit 4. This signal S1 is converted into digital signals by A/D converter 6 and then subjected to signal processing by D/A converters 9₁-9ₙ, adders 11₁-11ₙ and so forth. Accordingly, the signals provided from the respective buffers 17₁-17ₙ are affected by the deviations of circuit characteristics which exist in signal processing circuits of the respective channels. The signals provided from buffers 17₁-17ₙ are supplied to microcomputer 21 through switching circuits 18₁-18ₙ. Microcomputer 21 generates data Dfl-Dfn and Do1-Don to restrain deviations of reference signal components caused by the deviations of circuit characteristics of the respective channels. On the basis of the full scale level control data Dfl-Dfn, the full scale levels of the respective D/A converters 9₁-9ₙ are controlled. Similarly, on the basis of the offset level control data Do1-Don, the offset level by each of adders 11₁-11ₙ is controlled. As a result, the deviations produced among sampled video signals due to differences in circuit characteristics among channels can be reduced. This also yields an improvement of picture quality of the image obtained according to the sampled video signals, or the video signals R1-Rn. Furthermore, in the liquid crystal display device shown in FIG. 1, the picture quality of the image displayed on the liquid crystal module 64 is improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A sampled video signal generating device for sampling an applied video signal which includes an analog video signal at a predetermined cycle and for generating n-channel divided n video signals, where comprising:

means for generating a reference level signal defining a changeable level of the applied video signal;

inserting means receiving the video signal, for inserting the reference level signal into vertical blanking periods of the applied video signal;

sampling means for sampling the signal generated from said inserting means at said predetermined cycle, said sampling means comprising A/D converting means connected to an output of said inserting means for converting the analogue signal provided from said inserting means into n digital signals at said predetermined cycle;

n signal processing means connected to an output of said A/D converting means for applying predetermined signal processing to the respective converted digital video signals, said n signal processing means comprising n D/A converting means for converting the respective converted digital video signals generated from said A/D converting means into analogue signals;

detecting means, connected to outputs of said n signal processing means, for detecting reference level signals included in the respective signal-processed signals; and level control means responsive to said detecting means, for controlling changeable levels of the respective signals generated from said signal processing means, said level control means comprising highest level control means for controlling the vicinity of the highest level of signals generated from said signal processing means, wherein said highest level control means comprises full scale level control means for controlling the full scale level of each said D/A converting means in response to said detecting means.

2. A sampled video signal generating device for sampling an applied video signal on a predetermined cycle and generating n-channel divided n video signals, where n ≧ 2, comprising:

means for generating a reference level signal defining a changeable level of the video signal;

inserting means receiving the applied video signal, for inserting the reference level signal into vertical blanking periods of the applied video signal;

sampling means for sampling the signal generated from said inserting means at said predetermined cycle and generating n sampled video signals;

n signal processing means connected to the output of said sampling means and comprising n offset adding means connected to receive n sampled video signals generated from said sampling means and for adding an offset signal to each sampled video signal;

detecting means connected to outputs of said n signal processing means for detecting reference level signals included in the respective signal-processed signals; and level control means responsive to said detecting means, for controlling changeable levels of the respective signals generated from said signal processing means wherein said level control means comprise lowest level control means for controlling the vicinity of the lowest level of signals generated from said signal processing means in response to said detecting means.

3. The sampled video signal generating device according to claim 2, wherein said lowest level control means comprises offset control means for controlling level of an offset signal to be added by said offset adding means in response to said detecting means.

4. A sampled video signal generating device for sampling an applied video signal at a predetermined cycle and for generating n-channel divided n video signals, where n ≧ 2, comprising;

means for generating a reference level signal defining a changeable level of the applied video signal said reference level signal comprising a highest level vicinity reference signal for defining the vicinity of the changeable highest level of a video signal and a lower level vicinity reference level signal for defining the vicinity of the changeable lowest level of a video signal, inserting means receiving the applied video signal, for inserting the reference level signal into vertical blanking periods of the applied video signal, wherein said inserting means inserts said highest and lowest reference level signals into a single vertical blanking period of the video signal, sampling means for sampling the signal generated from said inserting means at said predetermined cycle and generating n sampled video signals;

n signal processing means, connected to an output of said sampling means, for applying predetermined signal processing to the respective sampled video signals;

detecting means connected to outputs of said n signal processing means, for detecting reference level signals included in the respective signal-processed signals; and level control means, responsive to said detecting means, for controlling the changeable highest level and lowest level of each signal generated from said signal processing means.

5. The sampled video signal generating device according to claim 4, wherein said detecting means comprises sequentially extracting means, connected to outputs of said n signal processing means, in response to a horizontal synchronous signal, for sequentially extracting level reference signal components included in the respective outputs of said n signal processing means.

6. The sampled video signal generating device according claim 5, wherein said sequentially extracting means comprises n switching means, connected to outputs of said n signal processing means, respectively, sequentially turning on in response to a horizontal synchronous signal, and whereby, the level reference signal components included in the respective outputs of said n signal processing means are sequentially extracted.

7. The sampled video signal generating device according to claim 4 wherein said video signal comprises one of primary color signals of red (R), green (G) and blue (B).

8. A sampled video signal processing device for generating n, wherein n ≧ 2, sampled video signals alternately inverted for each horizontal scanning period for a liquid crystal display device and sampled at predetermined cycle, comprising:

reference signal generating means for generating first and second reference signals respectively defining vicinities of changeable highest level and lowest level of a sampled video signal;

inserting means receiving a sample video signal, for inserting the pair of first and second reference signals into vertical blanking period of the video signal;

sampling means for sampling the signal provided from said inserting means at a predetermined cycles and generating n sampled video signals;

n signal processing means connected to an output of said sampling means, for applying predetermined signal processing to each sampled video signal;

detecting means connected to outputs of said n signal processing means, for detecting the first and second reference signals included in each signal-processed signal; and level control means responsive to said detecting means for controlling changeable levels of the respective signals generated from said signal processing means.

* * * * *